United States Patent [19]

Wieland

[11] 4,050,132

[45] Sept. 27, 1977

[54] METHOD OF PRODUCING A HOUSING FOR CIRCULAR PISTON COMBUSTION ENGINE OF TROCHOID TYPE

[75] Inventor: Werner Wieland, Obereisesheim, Germany

[73] Assignees: Audi NSU Auto Union Aktiengesellschaft, Neckarsulm; Wankel GmbH, Lindau Bodensee, both of Germany

[21] Appl. No.: 635,950

[22] Filed: Nov. 28, 1975

Related U.S. Application Data

[62] Division of Ser. No. 427,417, Dec. 21, 1973, Pat. No. 3,942,917.

[30] Foreign Application Priority Data

Dec. 21, 1972 Germany ............................ 2262620
June 30, 1973 Germany ............................ 2333364

[51] Int. Cl.[2] ............................................ B23P 17/00

[52] U.S. Cl. ....................... 29/156.4 R; 29/156.4 WL; 228/175; 228/187

[58] Field of Search ............... 29/156.4 R, 156.4 WL, 29/DIG. 4; 418/83, 178, 61 R, 61 A, 61 B, 60; 228/175, 178, 187

[56] References Cited

U.S. PATENT DOCUMENTS

| | | | |
|---|---|---|---|
| 1,270,044 | 6/1918 | Murray | 29/156.4 R |
| 1,382,420 | 6/1921 | Fuller | 29/156.4 R |
| 1,971,433 | 8/1934 | Tartrais | 29/156.4 WL |
| 2,199,423 | 5/1940 | Taylor | 29/156.4 R |
| 3,102,516 | 9/1963 | Gist et al. | 418/54 |
| 3,280,802 | 10/1966 | Froede | 123/8.01 |
| 3,292,601 | 12/1966 | Bensinger et al. | 418/83 |
| 3,575,537 | 4/1971 | Yamamoto | 418/178 |
| 3,620,137 | 11/1971 | Prasse | 123/193 C |
| 3,693,608 | 9/1972 | Neishi | 123/193 C |
| 3,715,178 | 2/1973 | Jones | 418/83 |
| 3,799,711 | 3/1974 | Nebesar et al. | 418/178 |

FOREIGN PATENT DOCUMENTS

| | | | |
|---|---|---|---|
| 2,027,115 | 12/1971 | Germany | 418/178 |

*Primary Examiner*—C.W. Lanham
*Assistant Examiner*—Daniel C. Crane
*Attorney, Agent, or Firm*—Kane, Dalsimer, Kane, Sullivan and Kurucz

[57] ABSTRACT

A housing for circular piston combustion engines of trochoid type is produced with at least one annular shell having an inner peripheral wall in the shape of a multi-arcuate trochoid, an outer peripheral wall, and end walls parallel to each other and adjoined to the ends of the shell, end pieces parallel to each other having end walls parallel to each other and an inner and an outer peripheral wall. In the case of a multiple engine at least one end piece constitutes a middle piece between neighboring shells.

6 Claims, 9 Drawing Figures

Fig. 7
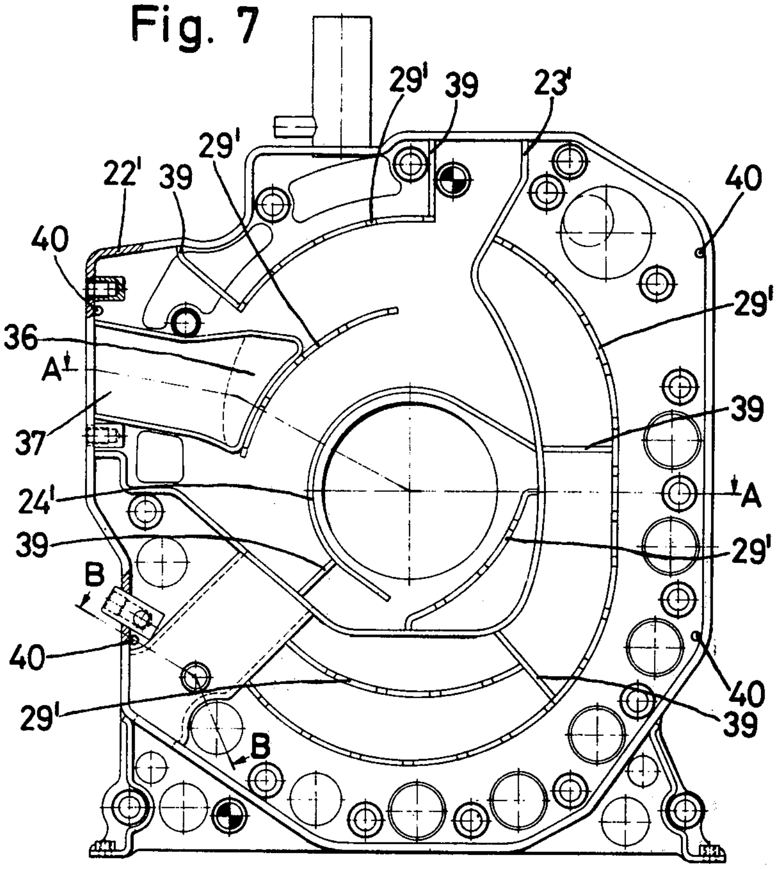
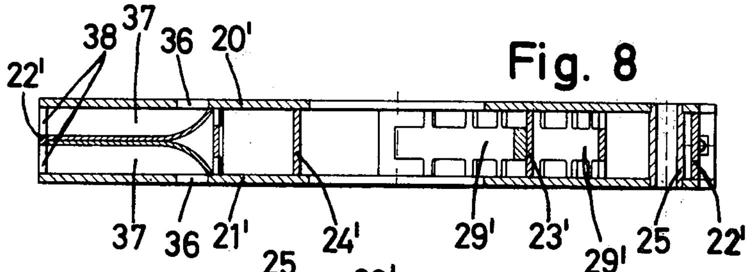
Fig. 8
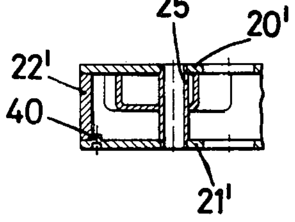
Fig. 9

METHOD OF PRODUCING A HOUSING FOR CIRCULAR PISTON COMBUSTION ENGINE OF TROCHOID TYPE

This is a division of application Ser. No. 427,417, filed Dec. 21, 1973 now U.S. Pat. No. 3,942,917.

BACKGROUND OF THE INVENTION

The shells and the end and/or middle pieces of such circular piston combustion engines have heretofore been fabricated as castings. The shell has consisted of a light metal casting, because its fabrication in cast iron, owing to comparatively low heat conductivity, resulted in excessive wall temperatures. An aluminum casting, however, is comparatively expensive, even if it can be produced by pressure casting. Furthermore, this comparatively soft material requires coating of the bearing surface with a hard material, the application and subsequent finishing of which is costly and time consuming.

SUMMARY OF THE INVENTION

The object of the invention is to lower the cost of building a housing for circular piston combustion engines.

For this purpose, it is proposed, according to the invention, that at least the shell walls consist of sheet steel parts, formed without machining, provided with apertures for through bolts and coolant passages where required. The parts are soldered or welded together at their points of contact. Interposed between the inner and outer peripheral walls, there are arranged stamped sheet spacer parts, nipples serving as inlet and/or outlet passages, and at least one insert to accommodate the sparkplug socket. Lengths of pipe between the end walls accommodate the through bolts, which parts are likewise soldered or welded to the respective walls.

All parts of the shell according to the invention, being sheet steel may be produced by simple pressing and stamping means. The remaining parts may be cut from pipe of appropriate sizes. The interior surface of the fabricated sheet steel inner peripheral walls serves as a bearing surface for the sealing elements of the piston part, the wall thickness may be considerably less than as a casting. In this connection there is no difficulty in achieving adequate stability of shape by appropriate arrangement of the spacers. This small and above all everywhere uniform wall thickness makes it possible to adequately carry off the heat evolved during the process of combustion.

Preferably, the inner peripheral wall surrounds the end walls, so that the faces of the peripheral wall are flush with the outer faces of the end walls. This avoids exposing the soldered or welded seams between these parts to the combustion gases and to shearing stresses due to the combustion pressures.

The inner peripheral wall may be made of a strip of steel suitably bent and welded together at the ends, or of two strip steel half-shells welded together at the ends. This strip may consist of hardenable steel, in which case the properly shaped and butt-welded inner peripheral wall will be carbonized in a hardening furnace before assembly of the shell and induction-hardened in the finished part. If required, a wear-resistant cladding or spraying with hard alloys may be provided. Alternatively again, the inner peripheral wall may consist of directly hardenable steel.

On the interior surface of the outer peripheral wall, between neighboring spacers, sheet coolant baffles may be soldered or welded in place oblique to the inner peripheral wall, to ensure supply of coolant to the inner peripheral wall.

As a further refinement of the invention, an embodiment is proposed in which, midway between the interior surfaces of the outer and inner peripheral walls and the neighboring spacers, a multi-part reinforcing plate is supported parallel to the end walls and soldered or welded to the adjoining parts. A baffle is arranged between the inner and outer peripheral walls and soldered or welded thereto. By this arrangement, especially in the "hot" region of the shell, greater stability of shape and additional conduction of heat from the inner peripheral wall to the coolant can be achieved. Hence it is expedient for the baffles to be arranged in the hot region and the reinforcing plate in the remaining region, to ensure supply of coolant to the inner peripheral wall proportionate to the temperatures acting on the inner peripheral wall.

The inner peripheral wall is provided with a wear resistant coating capable of being produced at low cost, towards this end, the inner shell wall has a spray-applied coating, fused in place of a well known wear resistant self-fluxing alloy. Such a coating may be applied by comparatively simple means, and has the advantage that it can be fused upon the base material during the ensuing soldering operation and enter into intimate connection with the latter. For this purpose, the melting temperature of the self-fluxing alloy and the working temperature of the soldering material should be about the same. This means that the soldering of the parts and the fusing of the coating can be carried out in a single operation, preferably using a temperature from 1000° to 1250° C.

To provide the interior surface of the inner peripheral wall of the shell with good sliding properties and favorable corrosion behavior, it is proposed further that the self-fluxing alloy contain nickel, chromium, boron and silicon as essential constituents. Since with this composition, a nickel-chrome alloy will be present when the coating has been fused, a very good corrosion resistance can be achieved in this case compared to a coating consisting essentially of nickel. Alternatively, however, the self-fluxing alloy may contain cobalt, chromium, boron and silicon as essential constituents.

To achieve a very high resistance to abrasion, the self-fluxing alloy may contain wear-resistant additives such as tungsten carbide for example. By addition of such hard materials, the self-fluxing alloy, especially suited to this purpose, may be rendered virtually as abrasion resistant as desired.

In the case of multiple circular piston combustion engines apart fom the shells, the middle piece especially is exposed to considerable thermal stresses, being acted upon by hot combustion gases from both sides. In the past cast-iron construction, a uniform wall thickness is not provided so that there will be distortion of the exterior faces of the middle piece, impairing the function of the sealing parts sliding upon it, in particular the oil seals on the piston.

According to the invention, the walls of the middle piece too consist of formed unmachined sheet steel parts with apertures for through bolts and passage of coolant. These parts are soldered or welded together at their surfaces of contact, while between the end walls, lengths of pipe are arranged to accommodate the through bolts and to carry coolant, and optionally spacers for additional support of the end walls against each other, likewise soldered or welded to the end walls.

As a result of this proposal, the wall thickness of the end walls is uniform and considerably less than in a casting, facilitating heat removal and lessening heat distortion. The end walls may without difficulty be rendered stable in shape by appropriate arrangement of sheet spacers. These spacers may be arranged like a fence. so that they touch the end walls only over isolated, comparatively small areas while coolant is able to circulate between these areas of contact.

In the case of circular piston combustion engines, to which the invention relates the housing is cooled with water, while the piston is cooled with oil serving simultaneously to lubricate the bearing and sealing members. The cooling and lubricating oil is generally carried off through the middle piece, which for this purpose must have a partition to separate the two different coolants. For this purpose the interior of the middle piece may be divided into two compartments by a sheet strip placed between the end walls and soldered or welded to them. The first compartment extends over the "hot" region of the middle part, that is, the region in which ignition and the expansion and exhaust strokes occur in the neighboring working chambers, and is intended to carry coolant for the housing; and the second compartment is intended to carry coolant for the piston, the latter compartment communicating through a slit in the inner peripheral wall with the space enclosed by the latter. This inner peripheral wall may be formed in part by the said sheet strip and in part by a band adjoined and unilaterally connected thereto. The slit is disposed between the other end of the band and the strip forming the partition. This construction is made possible by the fact that in double engines, no bearing for the eccentric shaft is required in the middle piece.

In a circular piston combustion engine where fresh gas is supplied to the working chamber by way of an end inlet, provision is made for the end walls of the middle piece each to have at least one inlet opening. A sheet part is also provided to be inserted between the end walls, bounding two inlet passages with the end walls to connect the inlet openings with openings in the outer peripheral wall of the middle piece.

The invention relates also to a method of producing a shell or middle piece according to the invention, wherein the sheet steel parts of the housing subassembly in question are stamped accurately. The nipples are cut to lengths and dimensions and then all housing parts are tack welded to one end wall for positioning, leaving a soldering gap. Whereupon a solder in paste form is applied to the points of contact and the second end wall is inserted, then the parts are soldered together in a soldering furnace. Finally the outer faces of the end walls are ground plane.

Instead of applying a soldering paste, all parts may be copper plated before or after tack welding. Then upon heating in the soldering furnace, the copper, now fluid, will be drawn into the crevices between parts by capillary action. This proposal presents the further advantage that the entire interior surface of the part in question will be covered when finished by a thin layer of copper, preventing coolant corrosion.

The interior surface of the inner peripheral wall may be inductively hardened or provided with a wear-resistant layer after the soldered assembly of the shell. The wear-resistant layer may be formed by a self-fluxing alloy. In this instance the self-fluxing alloy is first sprayed on the interior shell surface and all parts with solder applied at points of contact are soldered together in a soldering furnace, while at the same time the layer is fused. The self-fluxing alloy may be applied in known manner with a flame spray gun or by some other spray process. In the operation of soldering the shell and simultaneous fusion, the alloy applied may enter into a diffusion combination with the base material of the inner peripheral wall, in which case moreover a pore-free coating can advantageously form, having a multiple of the retention of ordinary spray coatings.

The exterior surfaces of the end walls of the middle piece may be hardened or provided with a wear resistant layer in the areas exposed to the piston.

Instead of connecting the parts by soldering, this may alternatively be done by welding, in particular the connection of the inner and outer peripheral walls of the shell to the end walls; laser or electron beam welding particularly reccomend themselves for this connection.

BRIEF DESCRIPTION OF THE DRAWINGS

In the drawings:

FIG. 7 shows an axial end view of a housing middle piece as in FIG. 6 with one end wall omitted;

FIG. 8 shows a longitudinal section at line A—A in FIG. 7 of a housing middle piece; and FIG. 9 shows a longitudinal section at line B—B in FIG. 7 of a portion of the housing middle piece.

DETAILED DESCRIPTION

Figure 1:
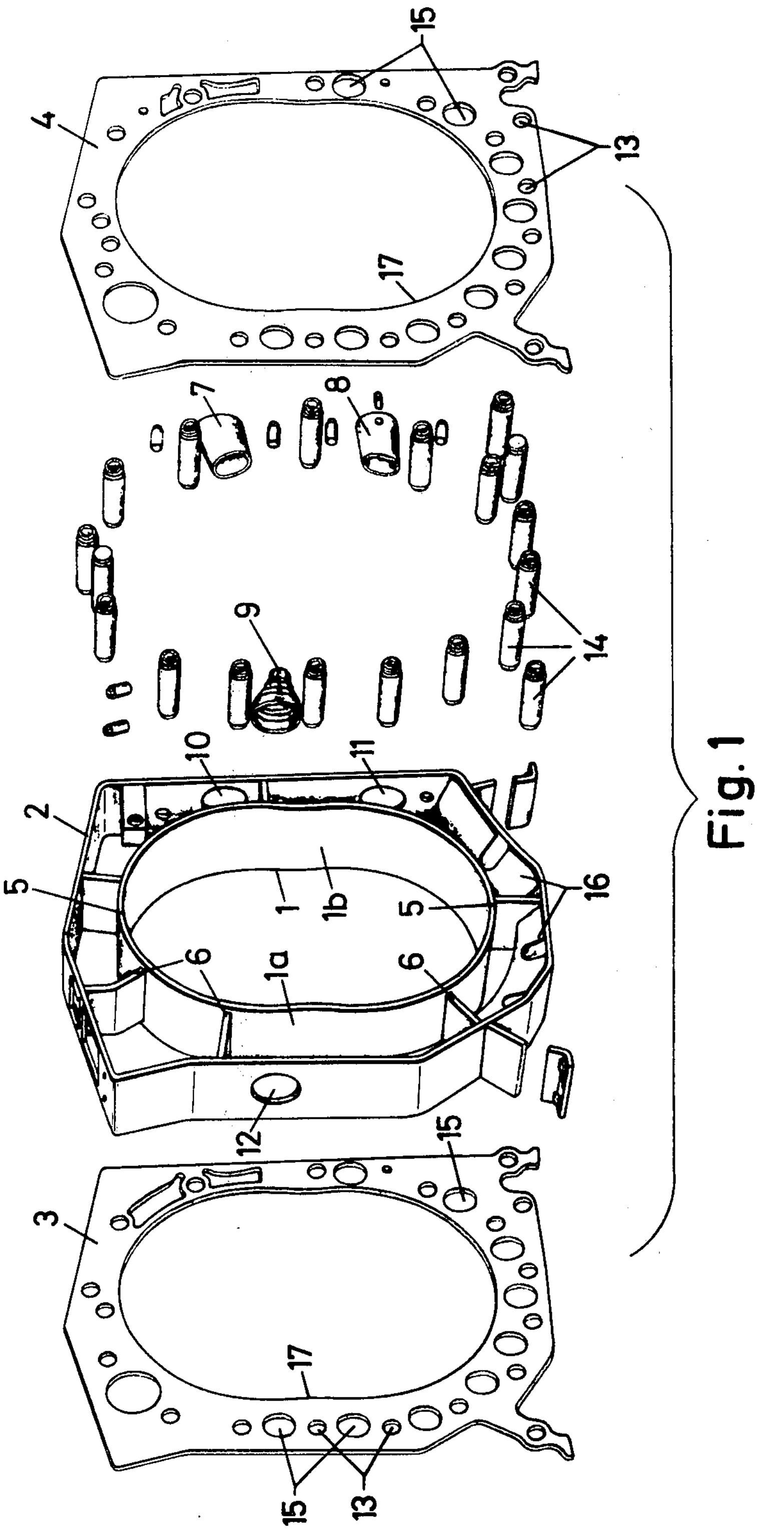
FIG. 1 shows an exploded perspective view of a housing shell according to the invention with associated componentry.

Referring initially to FIG. 1, the shell consists essentially of an inner peripheral wall 1, an outer peripheral wall 2, and end walls 3 and 4. The inner peripheral wall 1 has the shape of a bi-arcuate epitrochoid and is composed of two halves 1*a* and 1*b*, welded together where they abutt at 5. Between the two peripheral walls 1 and 2 stamped sheet spacer parts 6 are inserted as well as nipples 7 and 8 serving as inlet and outlet passages and an insert 9 to accommodate the sparkplug wall. The outer peripheral wall 2 consists of a suitably bent strip of steel with openings 10, 11 and 12 punched out to accommodate nipples 7 and 8 and sparkplug insert 9. The end walls 3 and 4 consist of stamped sheet with openings 13 to accommodate lengths of pipe 14 arranged between the end walls 3 and 4 to accommodate through bolts. Other openings 15 serve for passage of coolant. End walls 3 and 4 are of similar construction and have accompanying parts.

On the interior surface of the outer peripheral wall 2, particularly in the "hot" region of the shell, baffles 16 are arranged, running obliquely towards the inner peripheral wall 1 and deflecting coolant upon it to ensure effective cooling of said hot region.

All the parts of the shell are preferably soldered together. In that case, all parts except one end wall are mounted on the other end wall and fixed with spot welds, maintaining a soldering gap of for example 0.2 mm. Then the inner peripheral wall 1 lies in the inner aperture 17 of this end wall, its face is flush with the outer face of said end wall. Then at the points of abuttment or contact of the parts, a copper paste solder is applied, the other end wall is so placed that the inner peripheral wall 1 again lies in the central aperture 17, and its face is lined up flush with the outer face of the said end wall. The shell, thus assembled and prepared is placed in a soldering furnace in which all parts are soldered tight together. Finally the outer faces of the end walls are ground plane and the exterior face of the inner peripheral wall 1 is ground to its finished dimension and then hardened or if desired coated with hardening compounds and then finish ground.

Figure 2:
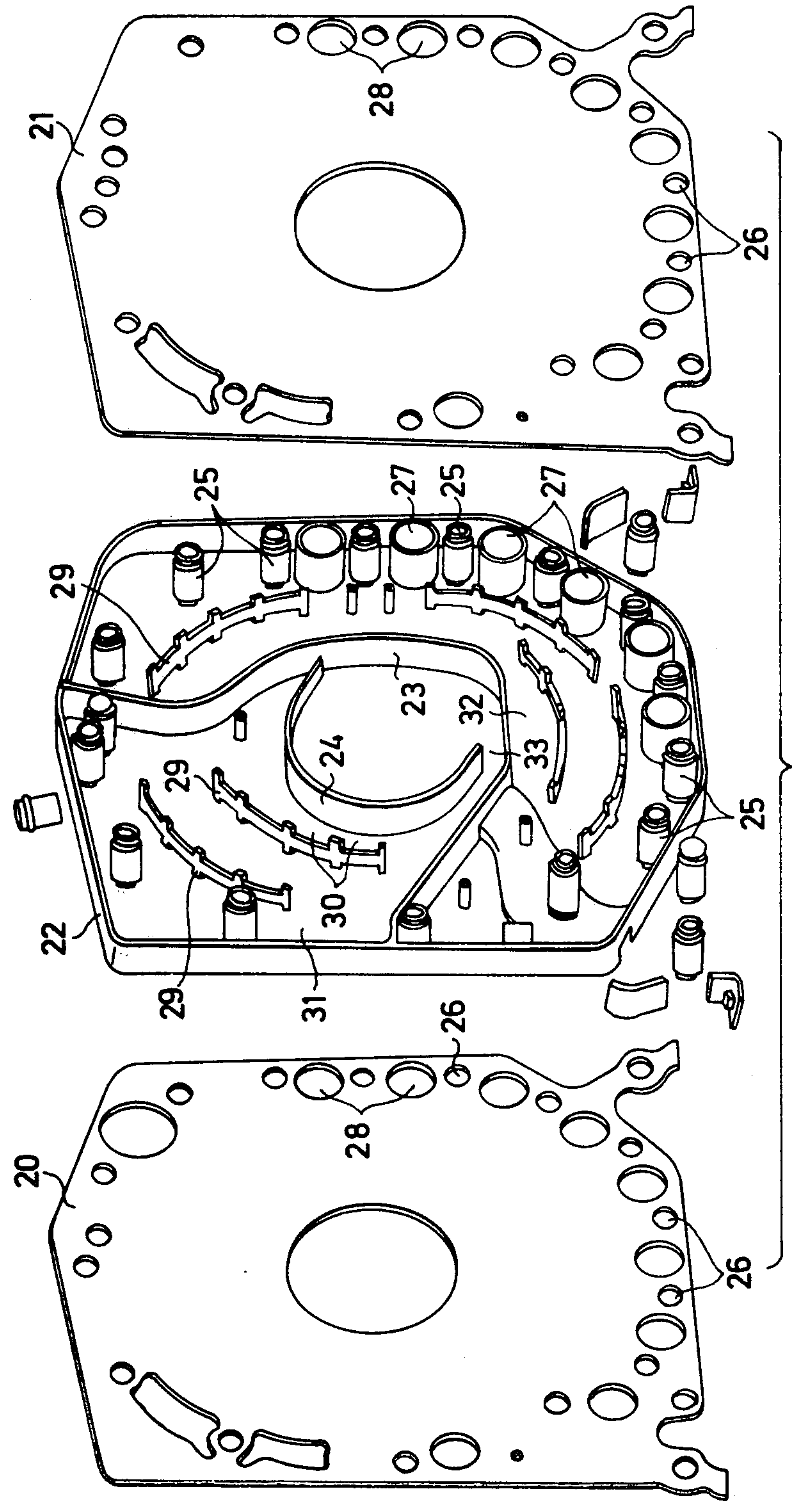
FIG. 2 shows and exploded perspective view of a housing middle piece with accompanying componentry.

The middle piece shown in FIG. 2 has end walls 20 and 21 and an outer peripheral wall 22. The inner peripheral wall is formed in this embodiment by part of a partition 23, and an approximately semicircular band 24, both placed between the end walls 20 and 21. Between end walls 20 and 21 lengths of pipe 25 accommodating through bolts are provided, engaging matching holes 26 in the end walls 20 and 21 and nipples 27 to carry coolant aligned with matching holes 28 in end walls 20 and 21. In addition, spacer sheets 29 are arranged between end walls 20 and 21, like a fence so that they are in contact with the interior surfaces of end walls 20 and 21 in isolated areas only between which areas of contact gaps 30 are left for passage of coolant.

The partition 23 divides the interior of the middle piece into two compartments 31 and 32, of which compartment 32 extends over the "hot" region of the piece and is traversed by the same coolant that traverses the other housing parts, while compartment 31 is intended to carry off the oil serving to cool the piston and lubricate the bearings and sealing parts. This cooling and lubricating oil can enter through gap 33 between band 24 and partition 23 into compartment 31.

As in the fabrication of the shell, the housing middle piece is also fabricated preferably by soldering all parts together. In that case all parts are mounted on one end wall, excepting the other end wall and fixed by spot welding. Then copper paste solder is applied to the points of abuttment in contact of the parts, the other end wall is placed upon them and likewise fixed by spot welding, and the piece so assembled and prepared is soldered tight in a soldering furnace. Then the exterior faces of end walls 20 and 21 are ground plane and if necessary hardened or provided with a wear-resistant layer before grinding.

Figure 3:
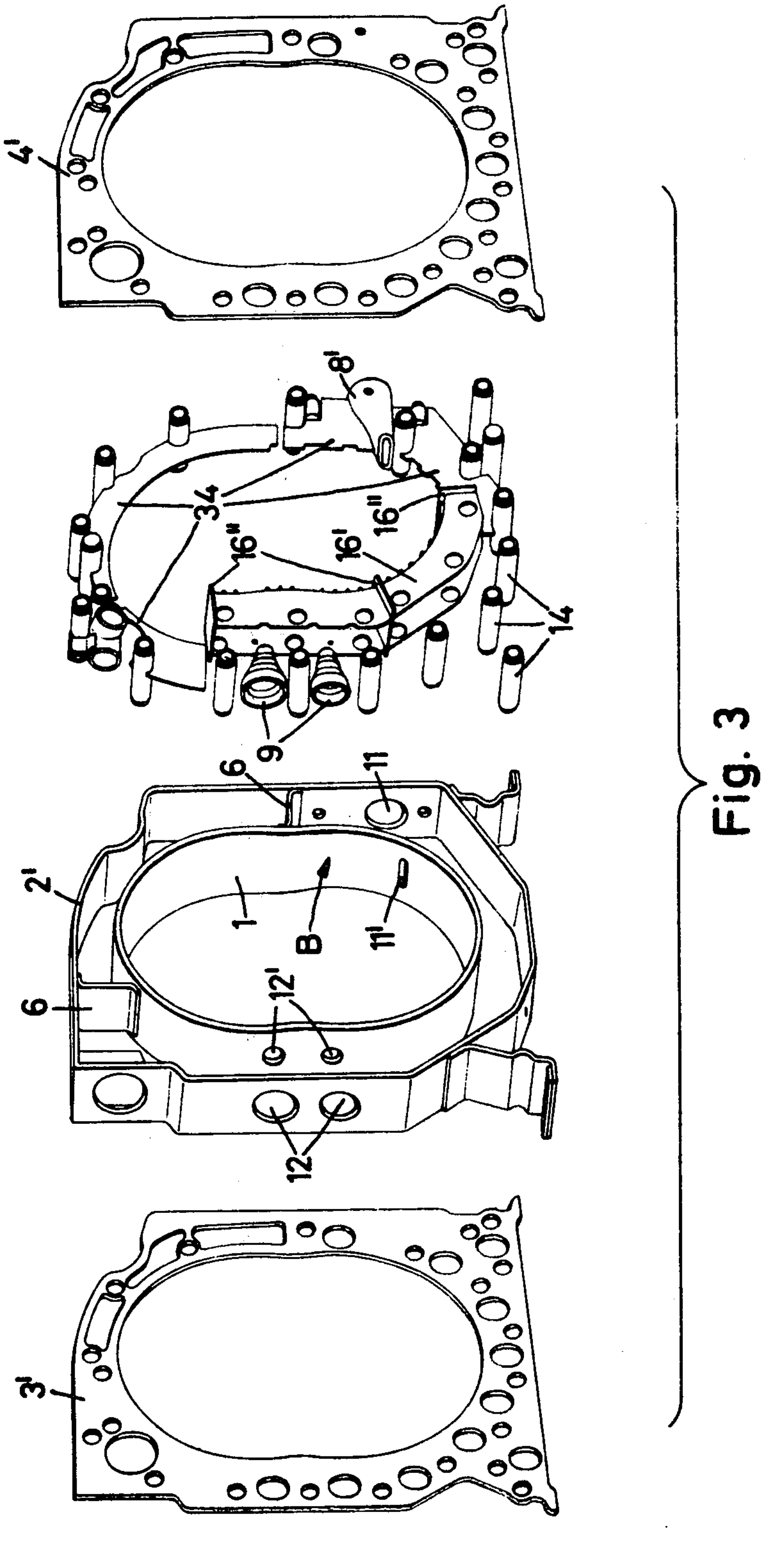
FIG. 3 shows an exploded perspective view of a second embodiment of a housing shell with accompanying details similar to FIG. 1.

In the housing shell shown in FIG. 3 the same references have been used for like or similar parts as in FIG. 1. In departure from the embodiment of FIG. 1 two sparkplug inserts 9 and only one pipe 8' serving as an outlet passage are provided; and the inner peripheral wall 1 has punched openings 12' and 11' to accommodate the sparkplug inserts 9 and the pipe 8'. In addition, to strengthen the inner peripheral wall 1 a multipartite reinforcing plate 34 is supported between it and the outer peripheral wall 2' about the axial center.

Figure 4:
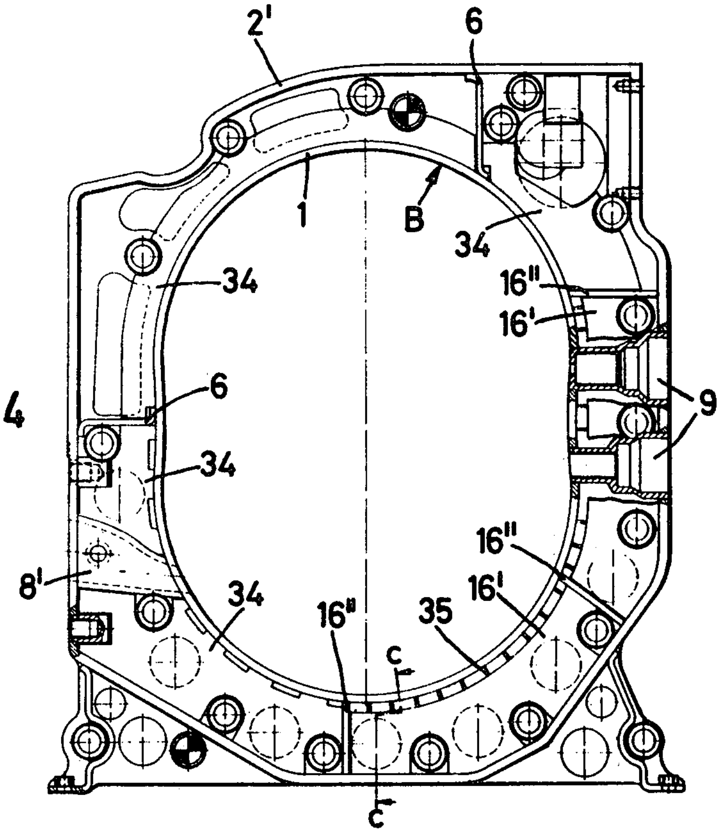
FIG. 4 shows an axial end view of a housing shell as in FIG. 3 with one end wall omitted.
Figure 5:
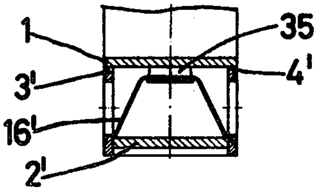
FIG. 5 shows a longitudinal section along line C—C in FIG. 4 of a portion of the housing shell.

FIGS. 4 and 5 show how the baffle 16' arranged in the "hot" region of the shell between the inner peripheral wall 1 and the outer peripheral wall 2' is supported for example by a bent tab 35 on the interior surface of the inner peripheral wall 1. In this region there is greater stability of shape and additional heat removal from the inner peripheral wall 1 by way of tab 35 into the baffle 16' which is surrounded by coolant. Baffle 16' has additional spacers 16" guiding the flow of coolant in the "hot" region and at the same time provides support between the inner peripheral wall 1 and the outer peripheral wall 2'.

In modified method of fabricating the housing shell according to FIG. 1, the parts except the two end walls 3' and 4' and the inner peripheral wall 1 and lengths of pipe 14, are assembled and fixed by spot welds, maintaining a soldering gap of for example 0.2 mm. Then this assembly is ground plane and provided with copper paste solder at the points of abuttment or contact of the parts. Thereupon the inner peripheral wall 1 on which the interior surface 3 forming the shell bearing surface has been sprayed with a self-fluxing alloy, and the two end walls 3' and 4' with pipe lengths 14 are inserted and placed in a soldering furnace. At the same time the self-fluxing alloy sprayed on the interior surface B of peripheral wall 1 is fused and provides a smooth poreless coating.

The further treatment of the housing shell except for the hardening operation — proceeds as described with reference to FIG. 1. The advantage of the present mode of fabrication is that the ground joint of end walls 3' and 4' with the outer peripheral wall 2' gives rise to an extremely narrow soldering crevice, making possible an economical use of solder, but more important, a better flow and setting of the solder, whereby a perfectly tight and strong soldered connection can be achieved.

Figure 6:
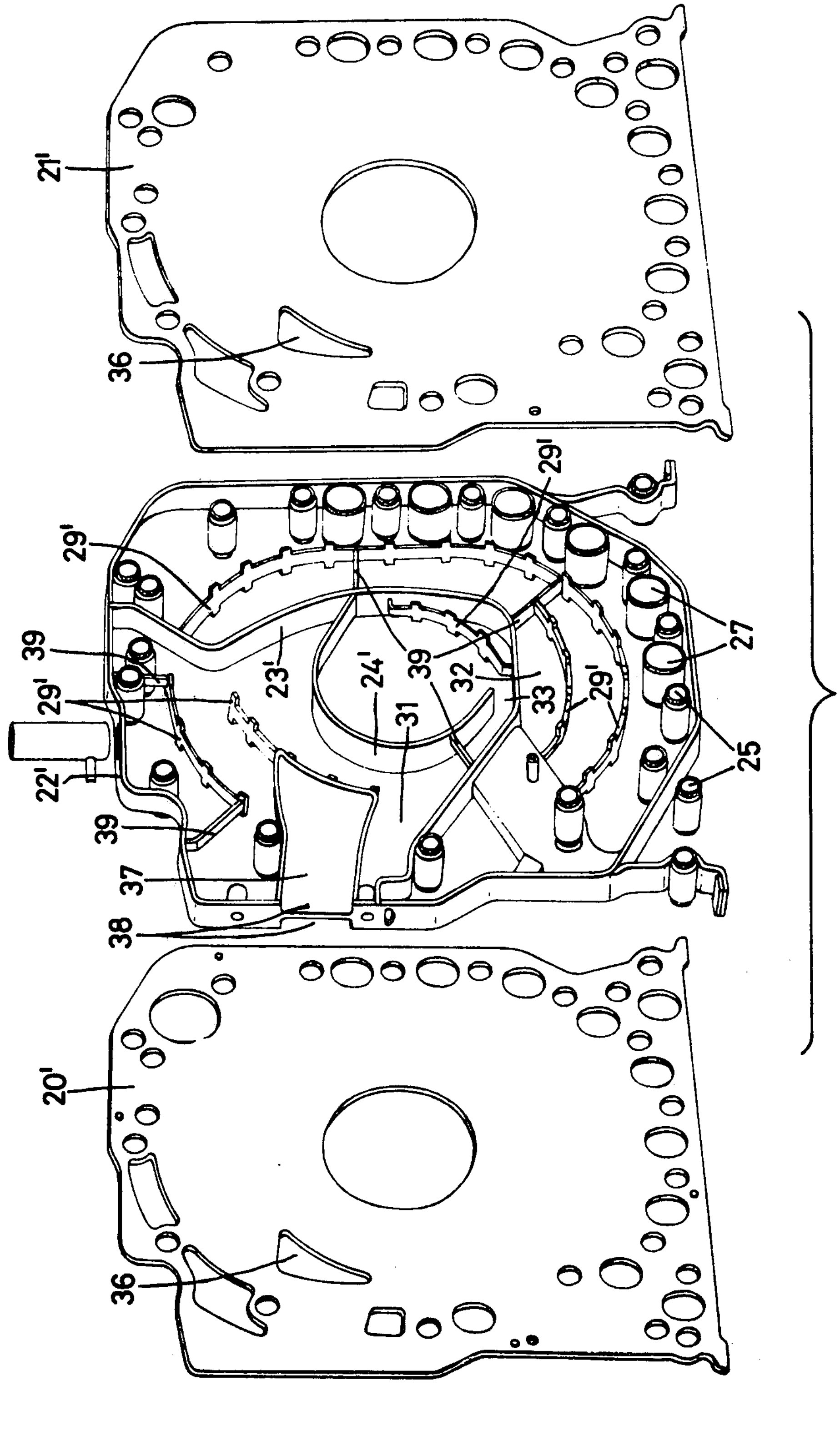
FIG. 6 shows an exploded perspective view of a second embodiment of a housing middle piece with accompanying details similar to FIG. 2.

In FIG. 6 like or similar parts of the middle piece shown have been labeled with the same references as in FIG. 2. In departure from the embodiment of FIG. 2 end walls 20' and 21' each exhibit an inlet opening 36 forming the end inlet of the working chamber. These openings communicate by way of two suitably shaped mirror-image sheet parts 37 forming the inlet passage, with one opening 38 each in the outer peripheral wall 22'. In addition, the fence-like spacers 29' and the semicircular band 24' have been extended or joined by auxiliary webs 39 to the neighboring surfaces so that the parts cannot change position during the manufacturing process.

FIGS. 7 and 8 show the arrangement of inlet passages formed by two sheet parts 37. In addition, as may be seen also in FIG. 9 half-punched incisions 40 have been impressed in end walls 20' and 21', serving for mutual fixation of end walls 20' and 21' with peripheral wall 22'.

In modification of the method of fabrication of the middle piece of FIG. 2, the parts except the two end walls 20' and 21' and the pipe lengths 25 and nipples 27, are assembled and fixed by spot welding. The resulting assembly, to obtain a narrow soldering crevice is ground plane on both ends, provided with copper paste solder at the points of abuttment and contact of the parts. Then with end walls fixed in place by semipunched incisions 40 and nipples and lengths of pipe the parts are soldered together tight in a soldering furnace. The further processing of this middle piece continues as described with reference to FIG. 2.

If the inner peripheral wall 1 of the housing shell and/or the end walls 20, 20', 21, 21' of the middle piece are made of directly hardenable steel the soldering, hardening and stress relieving may be done together in a vacuum furnace.

The housing parts according to the invention, in addition to the advantages previously mentioned have the advantages of lower cost of production and lighter weight compared to castings. Thus the several aforenoted advantages and objects are most effectively attained. Although several somewhat preferred embodiments have been disclosed in detail herein it should be understood that this invention is in no way limited thereby and its cope it to be determined by the appended claims.

I claim:

1. A method for producing the annular shell of a housing for a rotary combustion engine of trochoid type said shell comprising an inner peripheral wall in the shape of a multi-arcuate trochoid, an outer peripheral wall and two end walls parallel to each other, spacers between the inner and outer peripheral walls and at least one insert to accommodate a sparkplug, and lengths of pipes between the end walls for accommodating through bolts, comprising the following steps; accurately punching out from sheet steel said spacers and said walls with all openings for accomodating said pipes and insert, cutting said lengths of pipes, forming said insert, forming the inner and outer peripheral walls by bending the respective sheet steel parts, tack welding said spacers and insert between said inner and outer peripheral walls and tack welding said inner and outer peripheral walls as well as said lengths of pipes to one end wall in such a way that a soldering gap is left between these parts, applying a solder in paste form at the points of contact, adding the second end wall, soldering all parts together in a soldering furnace and finally plane-grinding the outer faces of the end walls.

2. A method for producing of the annular shell of a housing for a rotary combustion engine of trochoid type, said shell comprising an inner peripheral wall in the shape of a multi-arcuate trochoid, an outer peripheral wall and two end walls parallel to each other, spacers between the inner and outer peripheral walls and at least one insert to accomodate a sparkplug, and lengths of pipes between the end walls for accomodating through bolts, comprising the followings steps; accurately punching out from sheet steel said spacers and said walls with all openings for accomodating said pipes and insert, cutting said lengths of pipes, forming said insert, forming said inner and outer peripheral walls by bending the respective sheet steel parts, tack welding said spacers and insert between said inner and outer peripheral walls and tack welding said inner and outer peripheral walls as well as said lengths of pipes to one end wall in such a way that a soldering gap is left between these parts, adding the second end wall, galvanically copper plating all parts before or after tack welding, soldering all parts together in a soldering furnace and finally, plane-grinding the outer faces of the end walls.

3. A method according to claim 1 for producing a shell wherein the inner peripheral wall of the shell is case-hardened before tack welding.

4. A method according to claim 1 for producing a shell wherein the interior surface of the inner peripheral wall of the shell, after solder assembly of the shell, is induction-hardened.

5. A method according to claim 1 wherein a wear resistant layer is formed by a self-fluxing alloy sprayed on the interior surface of the inner peripheral wall, and all parts are soldered together in a soldering furnace with solders applied at the points of contact, a coating being fused at the same time.

6. The invention in accordance with claim 5 wherein the alloy has a melting temperature which corresponds to the working temperature of the soldering material.

* * * * *